Sept. 7, 1926.  
H. McMILLEN  
1,598,977  
ICE CUTTING MACHINE  
Original Filed Sept. 22, 1923
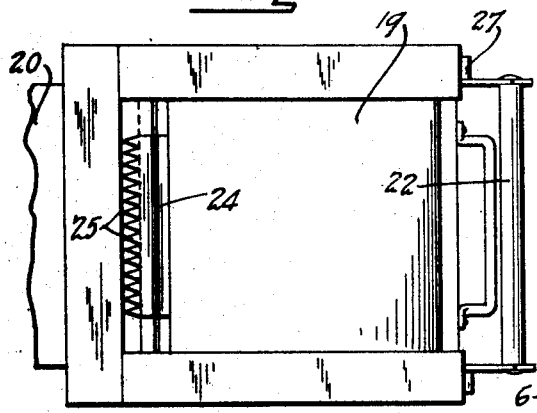
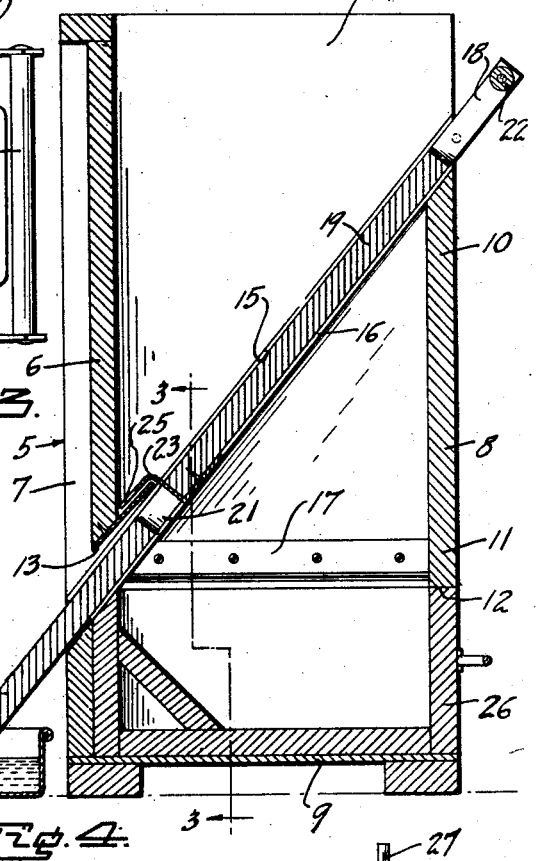
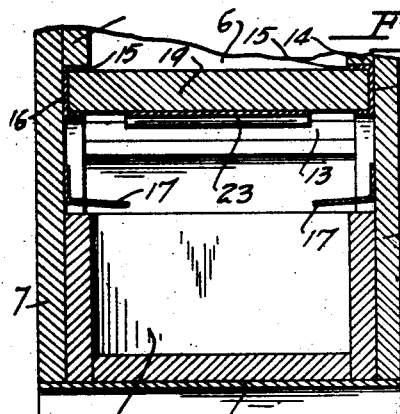
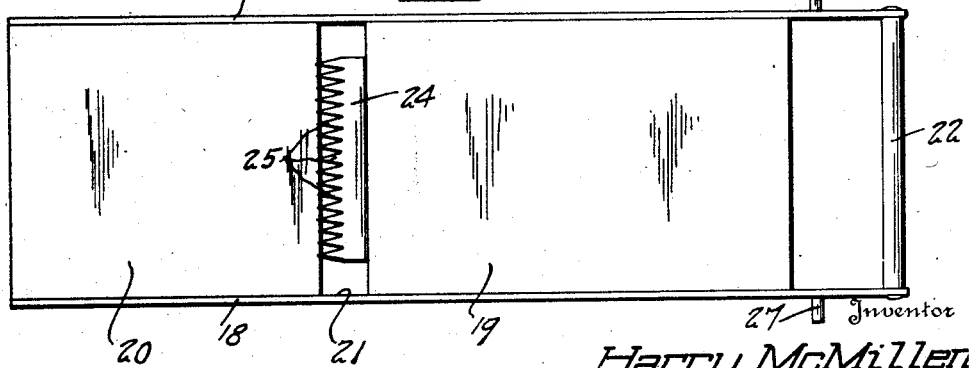
Inventor  
Harry McMillen  
By Watson E. Coleman  
Attorney Patented Sept. 7, 1926.

1,598,977

UNITED STATES PATENT OFFICE.

HARRY McMILLEN, OF TOPEKA, KANSAS.

ICE-CUTTING MACHINE.

Application filed September 22, 1923, Serial No. 664,212. Renewed January 25, 1926.

This invention relates to ice cutting machines, and has for its object to provide a machine wherein ice may be chipped without pulverizing a portion of the ice and without waste.

It is also an object of the invention to provide a machine of this character wherein the actuating member of the machine cooperates with the body portion of the machine to provide a compartment for the ice, and wherein the actuating member carries a cutting element for chipping ice.

It is a further object of the invention to provide a device of this character wherein the ice automatically moves into the path of the cutter as the size of the block of ice is decreased by the cutting operation.

With these and other objects in view, the invention consists in the improved construction and arrangement of parts to be hereinafter more particularly described, fully claimed and illustrated in the accompanying drawings, in which:—

Figure 1 is a longitudinal sectional view of an ice cutting machine constructed in accordance with an embodiment of the invention;

Figure 2 is a top plan view;

Figure 3 is a section taken on the line 3—3 of Figure 1; and

Figure 4 is a perspective view of the actuating member and cutting implement.

Referring to the drawings, 5 designates a casing which may be made of any desired material, such as wood, lined with metal, or entirely of metal. The casing includes a front wall 6, side walls 7, a rear wall 8, and a bottom 9. The top of the casing is open to permit the insertion of a block of ice. The rear wall 8 is made relatively short so that the upper edge 10 thereof terminates below the upper edge of the casing, while the lower edge 11 terminates in spaced relation to the bottom 9. The front wall of the casing has an opening 12 provided in its lower portion, said opening extending obliquely of said wall and downwardly, the upper and lower edges of the opening being beveled in view of the oblique position of the opening. Engaged with the upper beveled edge of the opening 12 and extending inwardly of the casing is a guard plate 13, the purpose of which will be hereinafter described.

Disposed inwardly of the casing and secured to the side walls thereof, adjacent the top of the casing, are plates 14, the lower face 15 of each face being beveled toward the opening 12. Engaged with each of the beveled faces of the plates 14, are guide members 16, said guide members being formed of channel iron and adapted to extend obliquely of the side walls of the casing. The lower ends of the guide members extend through the opening 12 in the rear wall of the casing, while the upper ends of the guide members extend above the edge 10 of the wall 6 and terminate flush with the front wall. By this means a double channel is provided which extends obliquely of the casing for a greater portion of the length of the casing. Secured to the side wall 7 of the casing, beneath the guide members 16, are plates 17 which extend inwardly of the casing beyond the guide members and serve as means to direct the ice into the lower portion of the casing.

In connection with the casing, an actuating member or lever is provided, said member substantially corresponding to the length and width of the casing. This member may be made entirely of metal or part metal and part wood. For the purpose of illustration, the actuating member comprises a pair of rods 18 between which plates 19 and 20 are disposed, the inner edges of said plates being spaced to provide an outlet opening 21. The outer edge of the plate 20 is beveled so as to clear the beveled lower edge of the opening 12. The upper ends of the rods 18 extend over the upper end of the plate 19 for the purpose of supporting a handle member 22 therebetween. This actuating member is intended for sliding movement in the guides 16, the plate 20 being movable through the opening 12.

In order that the ice may be properly chipped without pulverizing the same or causing waste, a novel cutting implement is provided, said implement consisting of a plate 23 having its longitudinal edge 24 offset longitudinally of the plate 23 and provided with a plurality of tapering teeth 25. The cutting implement is intended to be disposed in the opening 21 so that the longitudinal edge 23 engages the lower face of the plate 19, the offset portion extending through the opening so that the longitudinal edge 24 and teeth 25 are disposed in spaced relation relative to the upper face of the plate 20.

In the operation of the device the actuating member is moved obliquely of the casing between the guides 16 so that a block of ice placed in the upper portion of the casing will be chipped as the cutting implement passes the lower edge of the block. The chipped ice is intended to pass through the outlet opening 21 and into the lower portion of the casing, where it is received by a removable drawer 26. In view of the fact that the plate 20 is disposed in advance of the cutting element, any water that may drip from the ice will be directed outwardly through the opening 12 and will not pass into the drawer 26. In addition to this feature, the plate 19, as well as the plate 20, cooperates with the casing to provide a double compartment for the ice so that as the ice is cut the weight of the block will cause the same to move downwardly and inwardly of the body member of the machine into the path of movement of the cutting implement.

When the body member is not in use, the plate 11 serves as a guard for the teeth 25 as said plate is intended to be disposed between the teeth 25 and the plate 20, and to engage the offset portion. To prevent dulling of the teeth the rods 18, at their upper portions, are provided with stops 27 adapted to engage the upper end of the guide members 16 to limit movement of the actuating member.

From the foregoing it will be readily seen that this invention provides a novel form of ice cutting machine which chips the ice without pulverizing or wasting the same, and wherein the ice is delivered to a receptacle without permitting water dripping from the ice to enter the same. All of these features are possessed by a device which is compact in form and simple in construction.

What is claimed is:—

1. In an ice cutting machine, a casing, an actuating member movable across the casing intermediate the ends thereof and formed with an opening, a stationary blade carried by the front wall of the casing and arranged in slightly inclined relation with respect to the actuating member, and a toothed cutting member carried by the actuating member and overlying said blade.

2. In an ice cutting machine, a casing having a guide opening in its front wall, an actuating member slidable through the casing and through the said guide opening, a stationary blade secured at the upper edge of the guide opening and projecting into the casing in inclined relation toward the actuating member, the actuating member being formed with an opening, and a toothed cutting member carried by the actuating member and arranged in overlying relation to the opening and in overlapping relation to said blade.

3. In an ice cutting machine, a casing, an actuating member slidable therethrough and serving as a support for material to be cut, a stationary blade mounted on one wall of the casing and projecting in close proximity to the top surface of the actuating member, the actuating member having an opening therein and an angularly shaped cutting member secured within the end of the opening most remote from said blade and having a portion overlying the opening in a plane considerably above the top of the actuating member whereby to have overlapping engagement upon said blade.

4. An ice cutting machine comprising a casing having guides carried by the side walls thereof, said guides extending obliquely of the casing and through the front and rear walls thereof, an actuating member slidable in the guides, and a cutting element carried by the central portion of the actuating member and adapted to cut material disposed within the casing and above the actuating member, the rear end of the actuating member being provided with a handle and its forward end projecting beyond the casing to serve as a drain for melted ice.

5. An ice cutting machine embodying an elongated casing, guide members carried by the side walls of said casing, said guide members extending obliquely of the casing, an actuating member slidable in said guides, one end of said member being slidable through the rear wall of the casing and provided with a handle, the opposite end of the member being slidable through the front wall of the casing to serve as a drain for melted ice, said member having an opening in its central portion, a toothed cutting element secured within one end of said opening and spaced from and overlying the opening in a plane above the actuating member, the ice cut by the cutting element being adapted to pass through the opening in the actuating member into the lower portion of the casing.

In testimony whereof I hereunto affix my signature.

HARRY McMILLEN.